US012578313B2

(12) United States Patent (10) Patent No.: US 12,578,313 B2
Uchiyama (45) Date of Patent: Mar. 17, 2026

(54) AIR MEASUREMENT METHODS USING GAS CHROMATOGRAPH AND GAS CHROMATOGRAPH ANALYSIS SYSTEM

(71) Applicant: SHIMADZU CORPORATION, Kyoto (JP)

(72) Inventor: Shinji Uchiyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 316 days.

(21) Appl. No.: 18/276,858

(22) PCT Filed: Sep. 22, 2021

(86) PCT No.: PCT/JP2021/034722
§ 371 (c)(1),
(2) Date: Aug. 10, 2023

(87) PCT Pub. No.: WO2022/176251
PCT Pub. Date: Aug. 25, 2022

(65) Prior Publication Data
US 2024/0118248 A1      Apr. 11, 2024

(30) Foreign Application Priority Data
Feb. 22, 2021    (JP) ................................. 2021-025867

(51) Int. Cl.
*G01N 30/18*          (2006.01)
*G01N 30/02*          (2006.01)
(52) U.S. Cl.
CPC ....... *G01N 30/18* (2013.01); *G01N 2030/025* (2013.01)

(58) Field of Classification Search
None
See application file for complete search history.

(56)                 References Cited

U.S. PATENT DOCUMENTS 5,935,302  A        8/1999   Ju et al.
9,759,696  B2 *     9/2017   Sezaki ................... B01D 19/00
(Continued)

FOREIGN PATENT DOCUMENTS

CN           1654952  A      8/2005
CN        103308631  B  *   7/2015  ............. G01N 30/88
(Continued)

OTHER PUBLICATIONS

Extended European Search Report dated Dec. 18, 2024, for corresponding application No. EP 21926680.6.
(Continued)

*Primary Examiner* — Daniel S Larkin
(74) *Attorney, Agent, or Firm* — Muir Patent Law, PLLC

(57)                   ABSTRACT

An air measurement method of performing measurement by injecting air into a gas chromatograph includes a liquid suction step of sucking a liquid that does not interfere with detection of a predetermined component in air by a gas chromatograph into a syringe to fill the syringe with the liquid, an air suction step of sucking a predetermined amount of air into the syringe after the liquid suction step, an injection step of injecting the predetermined amount of air sucked into the syringe into the gas chromatograph after the air suction step, and a recording step of acquiring a detection signal for the air injected into the gas chromatograph in the injection step and recording an acquired detection signal in association with the air injection amount into the gas chromatograph.

7 Claims, 4 Drawing Sheets

(56) References Cited

U.S. PATENT DOCUMENTS

| | | | | | |
|---|---|---|---|---|---|
| 2013/0319080 A1* | 12/2013 | Sezaki | .................. | G01N 30/50 96/202 |
| 2018/0313793 A1* | 11/2018 | Takakura | .............. | G01N 30/16 |

FOREIGN PATENT DOCUMENTS

| | | | |
|---|---|---|---|
| CN | 109613160 | A | 4/2019 |
| JP | H10-206409 | A | 8/1998 |
| JP | H11153462 | A * | 6/1999 |
| WO | 2017/072893 | A1 | 5/2017 |

OTHER PUBLICATIONS

Written Opinion of the International Searching Authority for PCT application No. PCT/JP2021/034722 dated Nov. 22, 2021.
First Office Action dispatched on May 7, 2024 for the Japanese Patent Application No. 2023-500517.
First Office Action dated Aug. 14, 2025 for the Chinese Patent Application No. 202180094346.0.

\* cited by examiner

FIG. 3

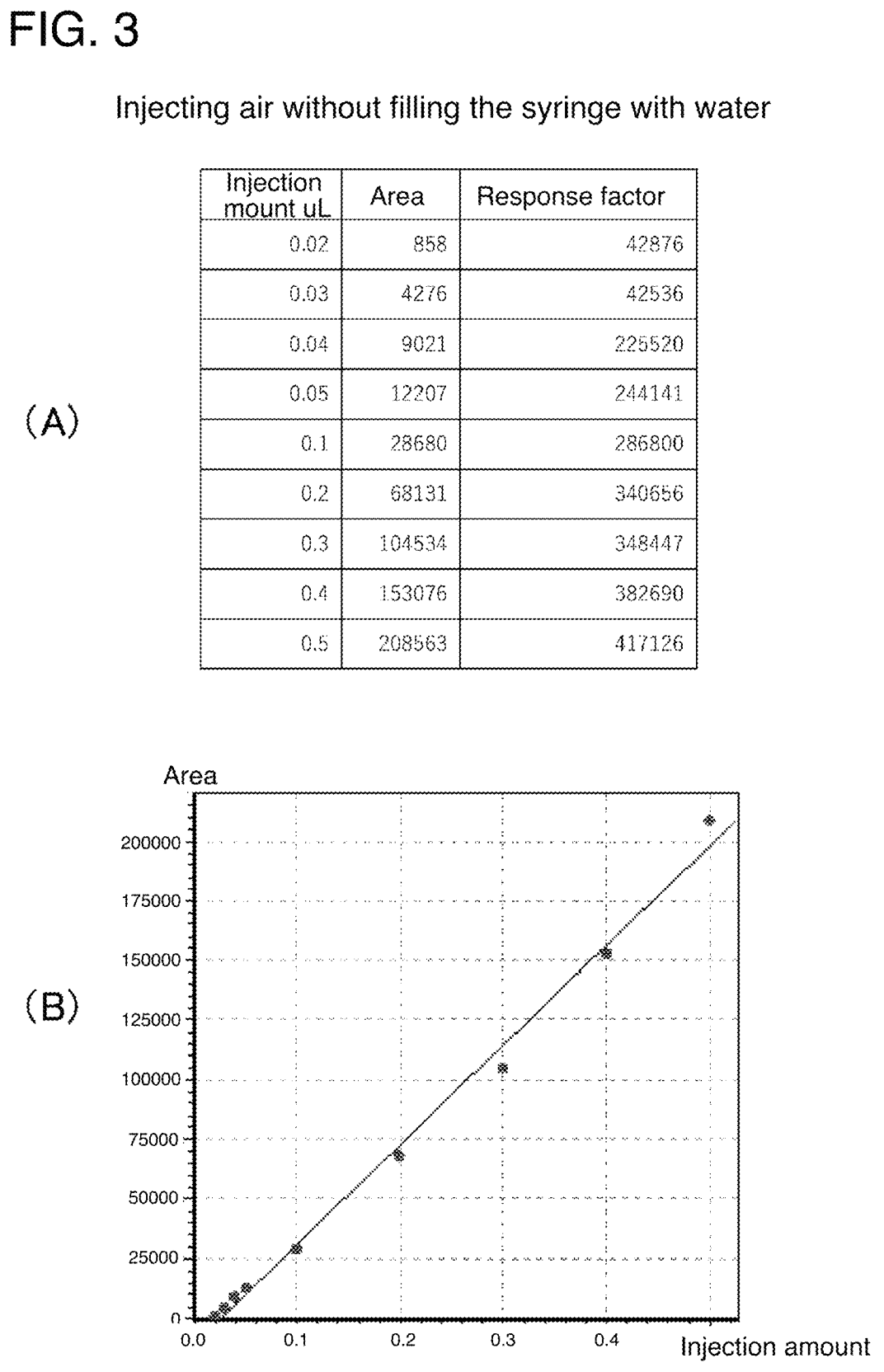

Injecting air without filling the syringe with water (A)

| Injection mount uL | Area | Response factor |
|---|---|---|
| 0.02 | 858 | 42876 |
| 0.03 | 4276 | 42536 |
| 0.04 | 9021 | 225520 |
| 0.05 | 12207 | 244141 |
| 0.1 | 28680 | 286800 |
| 0.2 | 68131 | 340655 |
| 0.3 | 104534 | 348447 |
| 0.4 | 153076 | 382690 |
| 0.5 | 208563 | 417126 |

(B)

Area

Injection amount

Injecting air in a state in which the syringe is filled with water (A)

| Injection mount uL | Area | Response factor |
|---|---|---|
| 0.02 | 7904 | 395176 |
| 0.03 | 13087 | 436221 |
| 0.04 | 18624 | 465606 |
| 0.05 | 24603 | 492054 |
| 0.1 | 51756 | 517557 |
| 0.2 | 106059 | 530293 |
| 0.3 | 159665 | 532217 |
| 0.4 | 217573 | 543932 |
| 0.5 | 269405 | 538810 |

(B)

AIR MEASUREMENT METHODS USING GAS CHROMATOGRAPH AND GAS CHROMATOGRAPH ANALYSIS SYSTEM

TECHNICAL FIELD

The present invention relates to an air measurement method using a gas chromatograph and a gas chromatograph analysis system.

BACKGROUND ART

A gas chromatograph analysis system is a system in which a liquid sample contained in a container is collected by an injector and injected into an injection port, the sample injected through the injection port is vaporized and introduced into a separation column together with a carrier gas, and the components in the sample separated by the separation column are detected by a detector (see, e.g., Patent Document 1).

The solvent of the sample to be injected into a gas chromatograph slightly contains a dissolved component, such as, e.g., oxygen and nitrogen, and in order to quantify such a trace component, it is necessary to prepare a calibration curve showing the relation between the concentration of the component and the detection signal of the gas chromatograph.

PRIOR ART DOCUMENTS

Patent Documents

Patent Document 1: International Publication No. WO 2017/072893

SUMMARY OF THE INVENTION

Problem to be Solved by the Invention

To generate a calibration curve for a trace component, such as, e.g., oxygen and nitrogen, present in the sample solvent, it is considered to adopt a method in which a dilution gas of an oxygen gas or a nitrogen gas is injected into a gas chromatograph for measurement, but it is difficult to generate a highly accurate calibration curve due to the effect of air contamination. Therefore, it is conceivable to adopt a method in which air is used as a sample to acquire a detection signal of oxygen or nitrogen. In such a case, air is sucked while measuring the air with an injector syringe, and a predetermined amount of air is injected into a gas chromatograph. However, in a usual method of simply sucking air with a syringe and injecting it into the gas chromatograph, it was found that the air was not injected from the syringe into the gas chromatograph accurately and that an accurate measurement result of the air could not be obtained.

The present invention has been made in view of the above-described problem, and the purpose of the present invention is to enable accurate execution of air measurement by a gas chromatograph.

Means for Solving the Problems

The present inventor has found that the accuracy of the air injection amount to a gas chromatograph is improved when the syringe is filled with a liquid, such as, e.g., water, and air is sucked into the syringe and then injected into the gas chromatograph. The present invention has been made based on the finding.

An air measurement method according to the present invention is an air measurement method of performing measurement by injecting air into a gas chromatograph, comprising:

a liquid suction step of sucking a liquid that does not interfere with detection of a predetermined component in air by a gas chromatograph into a syringe to fill the syringe with the liquid;

an air suction step of sucking a predetermined amount of air into the syringe after the liquid suction step;

an injection step of injecting the predetermined amount of air sucked into the syringe into the gas chromatograph after the air suction step; and a recording step of acquiring a detection signal for the air injected into the gas chromatograph in the injection step and recording an acquired detection signal in association with an air injection amount into the gas chromatograph.

A gas chromatograph analysis system according to the present invention includes:

a gas chromatograph configured to separate and detect components in a sample;

an injector having a syringe, the injector being configured to inject the sample into the gas chromatograph using the syringe; and a controller configured to control operations of the gas chromatograph and the injector, wherein the controller is configured, in an operation mode in which air is injected into the gas chromatograph by the injector for measurement, to suck a predetermined amount of air into the syringe after filling the syringe with the liquid that does not interfere with detection of a predetermined component in the air by sucking the air into the syringe and then inject the predetermined amount of air sucked in the syringe into the gas chromatograph by the injector.

Effects of the Invention

According to the air measurement method of the present invention, a liquid that does not interfere with the detection of a predetermined component of air is sucked into a syringe, and a predetermined amount of air is sucked into the syringe in a state in which the syringe is filled with the liquid, and the predetermined amount of air is injected into a gas chromatograph. Therefore, the accuracy of the air injection amount from the syringe to the gas chromatograph is improved, which makes it possible to accurately perform the measurement of air by the gas chromatograph. When injecting the air sucked into the syringe into the sample injection unit of the gas chromatograph, in a case where the inside of the syringe is filled only with air, it is considered that the air in the syringe is pushed toward the piston by the high pressure in the sample injection unit, and therefore, there occurs a phenomenon that the air in the syringe is compressed and the desired amount of air is not pushed out of the syringe, or a phenomenon that the air leaks out of the syringe through a slight gap between the inner wall of the syringe and the piston. By filling the syringe with a liquid first as in the present invention, the occurrence of the above-described problems is prevented, thereby improving the accuracy of the air injection amount into the gas chromatograph.

According to the gas chromatograph analysis system of the present invention, in an operating mode in which air is injected into a gas chromatograph by an injector for measurement, a liquid that does not interfere with the detection of a predetermined component in the air is sucked into the syringe to fill the syringe with the liquid, and then a predetermined amount of air is sucked into the syringe, and after that, the predetermined amount of air sucked into the syringe is injected into the gas chromatograph. Therefore, the accuracy of the air injection amount from the syringe to the gas chromatograph is improved, which allows the measurement of air by the gas chromatograph to be performed accurately.

BRIEF DESCRIPTION OF THE DRAWINGS

FIG. 3 shows one example of measurement data when air is injected without filling a syringe with water. (A) is a table showing the relation between each set injection amount and the peak area value of oxygen, and (B) is a correlation graph (calibration curve) between the injection amount and the peak area value generated based on the table in (A).

EMBODIMENTS FOR CARRYING OUT THE INVENTION

Hereinafter, one example of the air measurement method and the gas chromatograph analysis system according to the present invention will be described with reference to the attached drawings.

Figure 1:
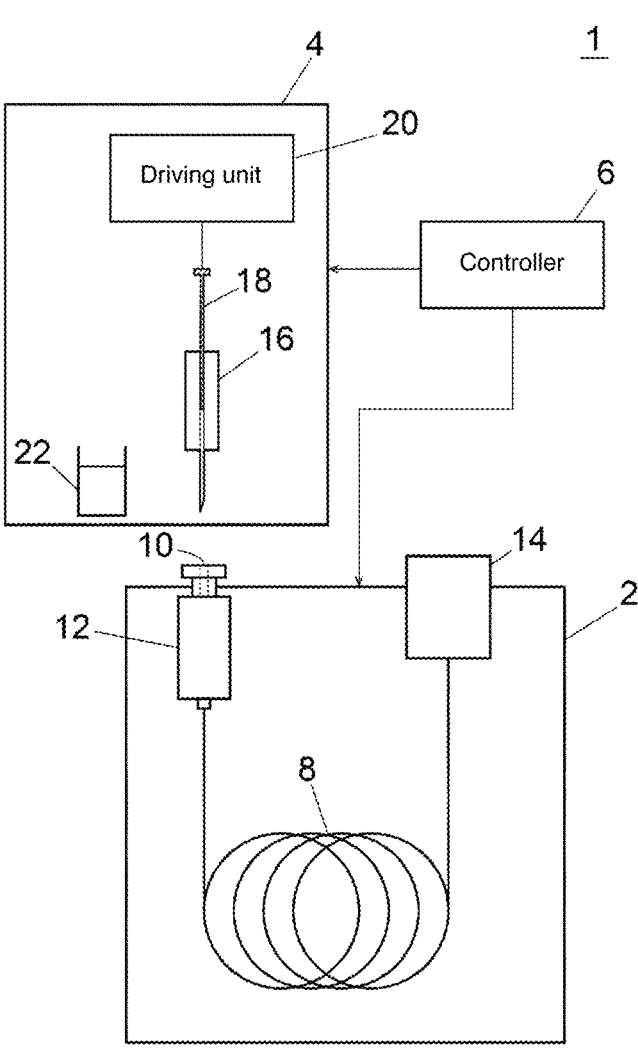
FIG. 1 is a schematic configuration diagram showing one example of a gas chromatograph analysis system.

As shown in FIG. 1, the gas chromatograph analysis system 1 is provided with a gas chromatograph 2, an injector 4, and a controller 6.

The gas chromatograph 2 is equipped with a separation column 8, a sample injection unit 12, and a detector 14. An injection port 10 is provided at the top of the sample injection unit 12, and the sample to be analyzed is injected into the sample injection unit 12 through the injection port 10. The inside of the sample injection unit 12 is high in temperature and pressure, so that the sample injected into the sample injection unit 12 is introduced to the separation column 8 together with the carrier gas supplied to the sample injection unit 12. The components in the sample introduced to the separation column 8 are separated in time therein, and the separated components are sequentially eluted from the separation column 8 and introduced to the detector 14. In the detector 14, a detection signal corresponding to the concentration of each component eluted in the separation column 8 is obtained.

The injector 4 is a device for injecting a sample into the sample injection unit 12 of the gas chromatograph 2 via the injection port 10 and is equipped with a syringe 16 and a driving unit 20 as main components. The syringe 16 is configured to suck and inject a fluid by sliding a piston 18 in the syringe 16. The driving unit 20 is configured to drive the piston 18 of the syringe 16 and is provided with a drive mechanism, such as, e.g., a motor. The syringe 16 is a micro syringe capable of metering and injecting a fluid of 0.5 μL or less. In the injector 4, a container 22 containing water which is a liquid that does not interfere with detection of components, such as, e.g., oxygen and nitrogen, in air by the gas chromatograph 2 is arranged to allow the water to be sucked into the syringe 16. Note that although there exists a small amount of dissolved oxygen and nitrogen in water, their dissolved concentrations are on the order of ppm and can be ignored. The liquid to be sucked into the syringe 16 before sucking air may be a liquid not containing a component, such as, e.g., oxygen and nitrogen, only to the extent that it does not affect the measurement of the component by the gas chromatograph 2, and does not necessarily to be water.

The controller 6 is a computer device for controlling the operations of the gas chromatograph 2 and the injector 4. The controller 6 is configured to perform the sucking of air into the syringe 16 in a state in which the syringe 16 is filled with water in an operation mode including the operation of injecting the air into the gas chromatograph 2 by the injector 4, e.g., in a preparation mode of preparing a calibration curve for oxygen and/or nitrogen using air.

Figure 2:
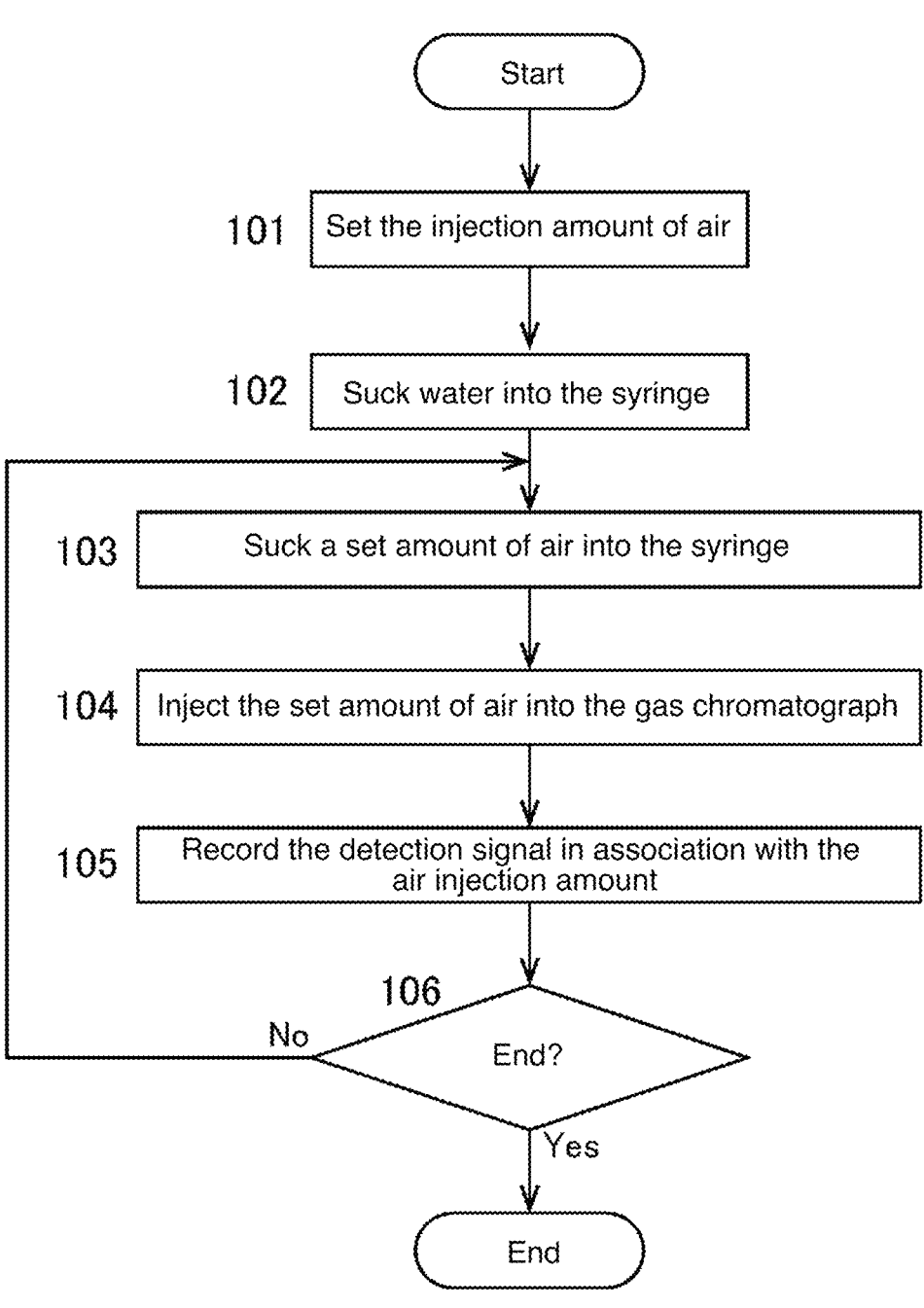
FIG. 2 is a flowchart showing one example of an air measurement operation in this example.

One example of the air measurement operation in the gas chromatograph analysis system 1 will be described using the flowchart shown in FIG. 2 with reference to FIG. 1.

First, the user sets the amount of air to be injected into the gas chromatograph 2 to the controller 6 (Step 101). When generating a calibration curve, a plurality of injection amounts can be set in this step. Upon completion of setting the air injection amount, the injector 4 causes the syringe 16 to suck water from the container 22 to fill the syringe 16 with the water (Step 102).

Thereafter, the injector 4 causes the syringe 16 to suck the set amount of air as an injection amount into the gas chromatograph 2 (Step 103). In cases where a plurality of air injection amounts is set, the syringe 16 may be made to suck the smallest amount of air out of the set air injection amounts. After sucking the predetermined amount of air into the syringe 16, the tip of the syringe 16 is inserted into the injection port 10, and the predetermined amount of air sucked into the syringe 16 is injected into the sample injection unit 12 (Step 104). At this time, the air in the syringe 16 is pushed out by the water lower in compression than the air due to the high pressure in the sample injection unit 12, and therefore, the exact amount of air is injected into the sample injection unit 12 without being affected by the compression of air. When injecting the air into the sample injection unit 12, there is a possibility that a part of the water that has reached the tip of the syringe 16 is unintentionally injected into the sample injection unit 12 due to discrimination. However, the concentration of oxygen and/or nitrogen dissolved in the water is on the ppm order, and therefore, the effect of the oxygen and/or the nitrogen on the measurement is negligible.

When the predetermined amount of air is injected from the syringe 16 into the sample injection unit 12, the injected air is mixed with the carrier gas and introduced to the separation column 8 in a state in which oxygen and nitrogen are diluted to be separated from each other, and a detection signal corresponding to the concentration is obtained by the detector 14. The controller 6 records the detection signal obtained by the detector 14 in association with the air injection amount to the gas chromatograph 2 (Step 105).

In cases where a plurality of air injection amounts has been set, Steps 103-105 are repeated for each set value (Step 106) in a state in which the syringe 16 is filled with water. Note that the present invention is not limited to the above, and Steps 102-105 may be repeated for each set value.

Figure 4:
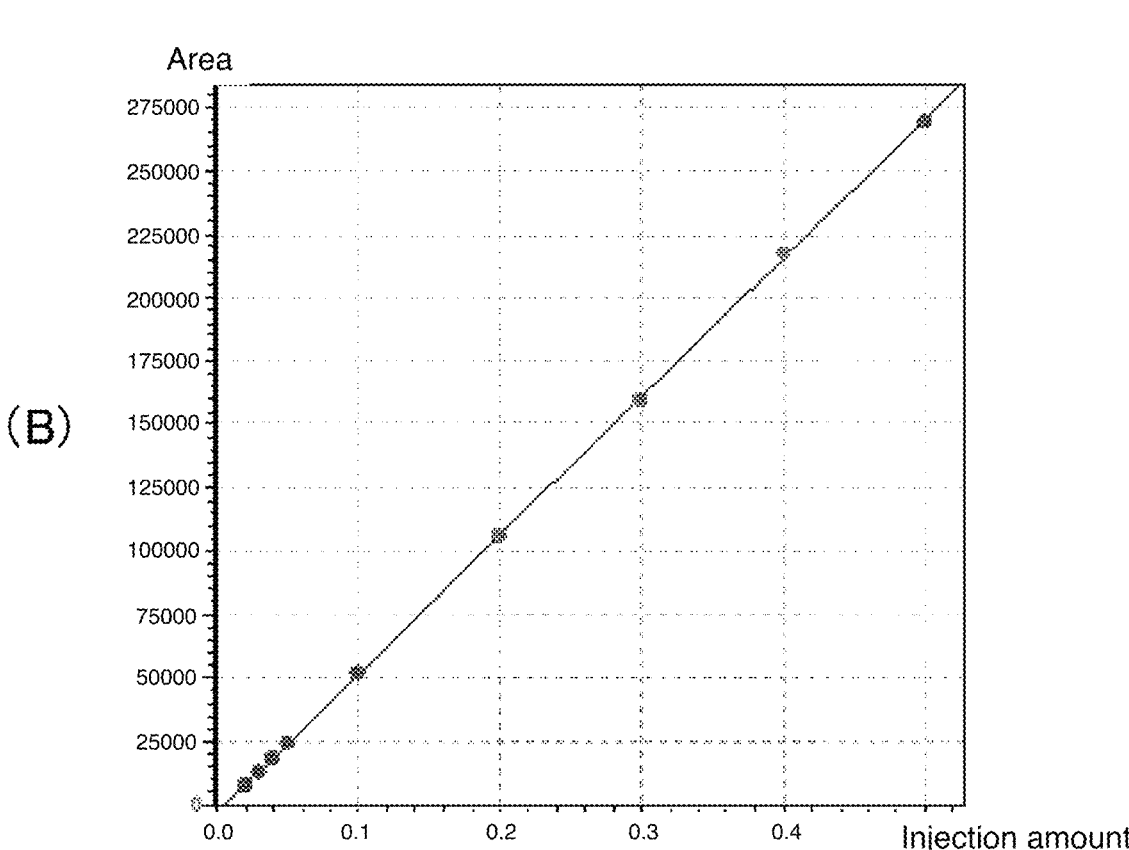
FIG. 4 shows one example of measurement data when air is injected without filling a syringe with water. (A) is a table showing the relation between each set injection amount and the peak area value of oxygen, and (B) is a correlation graph (calibration curve) between the injection amount and the peak area value generated based on the table in (A).

FIG. 3 shows the peak area value data for oxygen at each injection amount (set value) obtained by injecting air into the gas chromatograph 2 without filling the syringe 16 with water. FIG. 4 shows the peak area value data for oxygen at each injection amount (set value) obtained by injecting air into the gas chromatograph 2 in a state in which the syringe 16 is filled with water.

Comparing the peak area values at each injection amount in FIGS. 3 and 4, it is understood that it is larger when air is injected into the gas chromatograph in a state in which the syringe 16 is filled with water than when air is injected into the gas chromatograph 2 in a state in which the syringe 16 is not filled with water.

In the measurement of FIG. 4, only the amount of air set as the injection amount is sucked into the syringe 16 filled with water and injected into the gas chromatograph 2, and therefore, air exceeding the set value will not be injected into the gas chromatograph 2. In other words, the peak area value at each injection amount in FIG. 4 will not become larger than the original peak area value. Therefore, each peak area value in FIG. 3 that is smaller than each peak area value in FIG. 4 is larger in error with the original peak area value and low in accuracy than each peak area value in FIG. 4. This indicates that it is possible to perform the measurement of air by the gas chromatograph 2 with high accuracy by executing the air injection into the gas chromatograph 2 in a state in which the inside of the syringe 16 is filled with water.

Note that the example described above is only one example of an embodiment of the air measurement method and the gas chromatograph analysis system according to the present invention. Embodiments of the air measurement method and the gas chromatograph analysis system according to the present invention are shown below.

In one embodiment of the air measurement method according to the present invention, the air measurement method of performing measurement by injecting air into a gas chromatograph includes: a liquid suction step of sucking a liquid that does not interfere with detection of a predetermined component in air by a gas chromatograph into a syringe to fill the syringe with the liquid; an air suction step of sucking a predetermined amount of air into the syringe after the liquid suction step; an air suction step of sucking a predetermined amount of air into the syringe after the liquid suction step; an injection step of injecting the predetermined amount of air sucked into the syringe into the gas chromatograph after the air suction step; and a recording step of acquiring a detection signal for the air injected into the gas chromatograph in the injection step and recording an acquired detection signal in association with an air injection amount into the gas chromatograph.

In a first aspect of one embodiment of the above-described air measurement method, before the liquid suction step, a setting step of setting a plurality of air injection amounts into the gas chromatograph is provided, and after filling the syringe with the liquid in the air suction step, the injection step, and the recording step are performed for each of the plurality of injection amounts set in the setting step. In this manner, it is possible to shorten the time required for measurement at a plurality of air injection amounts by eliminating the repetition of the liquid suction step.

In the second aspect of one embodiment of the air measurement method, water is used as the liquid.

In one embodiment of the gas chromatograph analysis system according to the present invention, the system is provided with: a gas chromatograph for separating and detecting components in a sample; an injector having a syringe, the injector being configured to inject the sample into the gas chromatograph using the syringe; and a controller configured to control operations of the gas chromatograph and the injector, wherein the controller is configured, in an operation mode in which air is injected into the gas chromatograph by the injector for measurement, to suck a predetermined amount of air into the syringe after filling the syringe with the liquid that does not interfere with detection of a predetermined component in the air by sucking the air into the syringe and then inject the predetermined amount of air sucked in the syringe into the gas chromatograph by the injector.

In the first aspect of the above-described embodiment of the gas chromatograph analysis system, the operation mode is a mode in which the injection of air into the gas chromatograph by the injector is performed a plurality of times, and the controller is configured to repeatedly suck the air into the syringe and inject the air into the gas chromatograph in a state in which the inside of the syringe is filled with the liquid. In this manner, it is possible to reduce the time required for a plurality of air injections by eliminating the repetition of the liquid sucking operation into the syringe.

In the second aspect of one embodiment of the gas chromatograph analysis system, the liquid is water.

DESCRIPTION OF REFERENCE SYMBOLS

1: Gas chromatograph analysis system
2: Gas chromatograph
4: Injector
6: Controller
8: Separation column
10: Injection port
12: Sample injection unit
14: Detector
16: Syringe
18: Piston
20: Controller
22: Container (water)

The invention claimed is:

1. An air measurement method of measuring air by injecting air into a gas chromatograph through an injection port of the gas chromatograph from one end of a syringe including a piston therein, the syringe being configured to perform sucking and discharging of a fluid by sliding the piston therein, the air measurement method comprising:

a liquid suction step of retracting the piston to suck a liquid that does not interfere with detection of a predetermined component in air by the gas chromatograph from the one end of the syringe to fill the syringe with the liquid;

an air suction step of retracting the piston to suck a predetermined amount of air from the one end of the syringe into the syringe after the liquid suction step;

an injection step of advancing the piston to discharge the predetermined amount of air from the syringe into the gas chromatograph through the injection port to inject the predetermined amount of air into the gas chromatograph after the air suction step; and a recording step of acquiring a detection signal for the air injected into the gas chromatograph in the injection step and recording an acquired detection signal in association with the air injection amount into the gas chromatograph.

2. The air measurement method as recited in claim 1, further comprising:

a setting step of setting a plurality of air injection amounts into the gas chromatograph before the liquid suction step, wherein after filling the syringe with the liquid in the liquid suction step, the air suction step, the injection step, and the recording step are performed for each of the plurality of injection amounts set in the setting step.

3. The air measurement method as recited in claim 1, wherein the liquid is water.

4. The method of claim 1, wherein the air and the liquid remain separate within the syringe.

5. A gas chromatograph analysis system comprising:

a gas chromatograph configured to separate and detect components in a sample;

an injector having a syringe for performing suction and injection of a liquid from one end thereof, the injector being configured to inject the sample into the gas chromatograph using the syringe; and a controller configured to control operations of the gas chromatograph and the injector, wherein the controller is configured, in an operation mode in which air is injected into the gas chromatograph by the injector for measurement, to retract a piston of the syringe to suck a predetermined amount of air from one end of the syringe into the syringe after filling the syringe with the liquid that does not interfere with detection of a predetermined component in the air by retracting the piston to suck the liquid from the one end of the syringe into the syringe and then advance the piston to inject the predetermined amount of air sucked in the syringe into the gas chromatograph by the injector.

6. The gas chromatograph analysis system as recited in claim 5, wherein the operation mode is a mode of performing a plurality of injections of the air into the gas chromatograph by the injector, and wherein the controller is configured to repeatedly suck the air into the syringe and inject the air into the gas chromatograph in a state in which the syringe is filled with the liquid.

7. The gas chromatograph analysis system as recited in claim 5, wherein the liquid is water.

* * * * *